(12) United States Patent
Faccin et al.

(10) Patent No.: US 7,849,190 B2
(45) Date of Patent: Dec. 7, 2010

(54) INTERNET PROTOCOL BASED SERVICE ARCHITECTURE

(75) Inventors: Stefano Faccin, Dallas, TX (US); Curt Wong, Plano, TX (US); Srinivas Shreemanthula, Arlington, TX (US); Jari Mutikainen, Irving, TX (US); Khiem Le, Coppell, TX (US); Basavaraj Patil, Coppell, TX (US); Syed Hossain, Irving, TX (US); Kari Kurronen, Irving, TX (US); Juhapekka Niemi, Coppell, TX (US); Kengatharan Sivalingam, Irving, TX (US)

(73) Assignee: Nokia Siemens Networks Oy, Espoo (FI)

( * ) Notice: Subject to any disclaimer, the term of this patent is extended or adjusted under 35 U.S.C. 154(b) by 1119 days.

(21) Appl. No.: 09/792,499

(22) Filed: Feb. 23, 2001

(65) Prior Publication Data

US 2002/0120729 A1  Aug. 29, 2002

(51) Int. Cl.
*G06F 15/173* (2006.01)
*G06F 15/177* (2006.01)
(52) U.S. Cl. .................. 709/226; 709/217; 709/223
(58) Field of Classification Search ............ 709/203, 709/223, 224, 225, 226, 227, 228, 229, 232, 709/249, 219, 217; 707/10
See application file for complete search history.

(56) References Cited

U.S. PATENT DOCUMENTS 5,574,904 A    11/1996  Yunoki et al.
5,889,942 A *   3/1999  Orenshteyn ................... 726/3
5,951,694 A *   9/1999  Choquier et al. ............. 714/15
6,058,175 A *   5/2000  Schultz ................... 379/201.05
6,061,729 A     5/2000  Nightingale
6,115,746 A *   9/2000  Waters et al. ............... 709/229
6,327,622 B1*  12/2001  Jindal et al. ................ 709/228
6,360,262 B1*   3/2002  Guenthner et al. .......... 709/226
6,369,840 B1*   4/2002  Barnett et al. ............... 715/853
6,430,599 B1*   8/2002  Baker et al. ................. 709/203
6,625,141 B1*   9/2003  Glitho et al. ................ 370/352
6,625,274 B1*   9/2003  Hoffpauir et al. ........... 379/229
6,643,690 B2*  11/2003  Duursma et al. ............ 709/217
6,671,259 B1*  12/2003  He et al. ..................... 370/238
6,829,349 B1*  12/2004  Neale et al. ............. 379/265.09
2002/0174247 A1* 11/2002  Shen ......................... 709/238

FOREIGN PATENT DOCUMENTS

WO    WO 98/36542    8/1998
WO    WO 00/42760    7/2000

* cited by examiner

*Primary Examiner*—Hussein A Elchanti
(74) *Attorney, Agent, or Firm*—Squire, Sanders & Dempsey L.L.P.

(57) ABSTRACT

A network system comprising a service control device (SEM); and at least one application execution device (AEE); wherein the service control device (SEM) is adapted to receive a service request, to select an appropriate application execution device according to the service request, and to invoke the selected application execution device, and wherein the application execution device (AEE) is adapted to perform the service requested by the service request. A corresponding network control method is also provided. According to the invention, a flexible service architecture is possible.

47 Claims, 11 Drawing Sheets

INTERNET PROTOCOL BASED SERVICE ARCHITECTURE

FIELD OF THE INVENTION

The present invention relates to a network system and a network control method for providing services in the network.

BACKGROUND OF THE INVENTION

The invention relates to the services environment of any kind of IP (Internet Protocol) based networks, including but not limited to the Internet, VoIP (Voice over IP) networks, 3G R00 cellular systems, WLAN (Wireless Local Area Network), Cable etc. The invention belongs to the same field as the wireless intelligent networking service environments that are applicable to the existing cellular systems. Examples for such intelligent networks are CAMEL (Customised Application For Mobile Network Enhanced Logic) or WIN (Wireless IN). In additions it also relates to efforts within IETF (Internet Engineering Task Force) in the PINT (PSTN (Public Switched Telephone Network)/Internet Interworking).

There are significant thrusts in 3GPP (Third Generation Partnership Project) and other SDOs (Standard Development Organisations) in developing a packet based multimedia communications network architecture as next generation wireless/cellular networks. These networks must be capable of supporting wide range of services (e.g. VoIP, multimedia, e-mail, instant messaging, WEB browsing, WAP (Wireless Application Protocol), etc.) currently available as well as the future services that may be developed.

Currently available service architecture based on CAMEL (or WIN) are voice centric suitable for a traditional voice-based telecommunication network. A multimedia service, by definition, can include more than one media sessions like voice, video, text etc. Further, the existing IN service models utilize technologies and protocols applicable within the telecom industry. There are other parallel efforts in this area trying to make IP services available to the IN (Intelligent Network) subscriber (3GPP) and otherwise trying to make IN services available to the IP or other subscriber (PINT, Parlay). In these efforts, emphasis was placed on a hybrid environment wherein services are made available from ore domain to the other.

However, the above networks do not provide a sufficient flexibility in order to meet the wide range of requirements put forth by the above-described next generation IP networks at the services environment level.

SUMMARY OF THE INVENTION

Therefore, the object underlying the invention resides in providing a network system and a network controlling method by which a plurality of different services can be supported.

This object is solved by a network system comprising
a service control device; and
at least one application execution device;
wherein the service control device is adapted to receive a service request, to select an appropriate application execution device according to the service request, and to invoke the selected application execution device, and
wherein the application execution device is adapted to perform the service requested by the service request.

Alternatively, the above object is solved by a method for controlling a network, the network comprising a service control device and at least one application execution device;
the method comprising the steps of
receiving, by the service control device, a service request,
selecting an appropriate application execution device according to the service request,
invoking the selected application execution device, and
performing, in the selected application execution device the service requested by the service request.

Thus, according to the invention, managing of a requested service and actually executing of the service are performed by different entities. This allows a very flexible handling of service execution in a network. Hence, a plurality of different services can be supported in a network.

The network system may further comprise a service information database in which information about services are stored, wherein the service control device is adapted to access the service database, and to use the service information for selecting and invoking the application execution device.

By this measure, the service control device itself does not need to have detailed information about a particular service, since it can easily retrieve current service information from the service information database. The information stored in the service information database can easily be updated. Hence, a flexible handling of the services is possible. The information about services may be stored as service scripts describing the respective service.

Moreover, the information about services may be specific for each user. Thus, services to which the particular user is subscribed can easily be determined. The service control device may be adapted to retrieve information about services from the service information database based on an identifier associated to a user.

The service control device may comprise a memory means in which the information obtained from the service database can be temporarily stored. Thus, it is not always necessary to access the service database. Hence, the load on the network is reduced. The information stored in the service control device may be updated at regular intervals (e.g., once a day), for example. Or there could be a trigger in the service information database to update service control device every time a new service appear or old ones disappear.

The network system may further comprise a call/session managing device for forwarding service requests to the service control device.

The network system may further comprise a service location managing device for maintaining an association between the service control device and a user.

The network system may further comprise a service logic database for service logic information, wherein the application execution device may be adapted to access the service logic database in order to obtain information for executing a requested service. Thus, the application execution device does not have itself current information about the execution of a particular service, but can get current information from a central database.

The information for executing a requested service may be stored in form of a service logic script stored in the database.

The network system may further comprise a service managing device for generating and/or modifying of service information to be stored in the service database, and/or a service managing device for generating and/or modifying information to be stored in the service logic database. It is noted that the service managing device may be adapted to generate and/or modify both kinds of information.

The network system may further comprise an interaction means which is adapted to provide an interface between the service managing device and a user.

The network may be adapted to access an external subscriber database which may not be part of the network, and wherein the subscriber database is adapted to store identifiers.

Moreover, a plurality of service control devices may be provided and an appropriate service control device may be selected by a selecting device. The selecting device may be adapted to select a service control device in dependence on the operation load of the respective service control device.

Furthermore, an association between a particular user and the selected service control device may be maintained. Thus, it is not necessary to always select a service control device for the user. Hence, the control of the network is simplified.

Maintaining the association between the user and the selected service control device may be effected by using a mapping table.

The service location managing device may be adapted to manage resources information for selection of a service control device.

As a protocol for signalling between the devices the Session Initiation Protocol (SIP) or the Lightweight Directory Access Protocol (LDAP) may be used.

According to the invention, a plurality of different services can be handled. For example, the requested service may be a registration to a particular service, or an initiation of a communication session.

Thus, according to the invention, a new service architecture is provided, which is referred to as IPSA (IP based Service Architecture). For the basis of the IPSA according to the present embodiment, the following aspects were taken into consideration:

There is a focus on the concept of "session". That is, according to the present invention, the services are not restricted to be call-related.

The need to integrate different types of end user services has been met. The different type of services may include VoIP, multimedia, e-mail, instant messaging, WEB based services etc.

Furthermore, the service architecture allows services to be implemented for different types of end user services. "Supplementary" services are not only for a call, but more in general for any "session" the user may be involved in.

The service architecture is defined such that operators and third party service providers are allowed to have revenues from offering "value added services".

The service architecture according to the present invention is not voice centric, it is designed to easily support and integrate different IP based services such as unified messaging, Web, presence & instant messaging, click2dial etc.

It can easily integrate with the services provided by 3rd party service provider or another IPSA provider.

IPSA is transparent to any access technology including wireless (e.g GSM, UMTS, CDMA2000).

IPSA applies to both the wireless and wire-line access networks (e.g. cable, WLAN, wireless)

It provides complete flexibility for different service deployment and business cases. (services can be provided by different levels by different operators e.g. Application Execution Engine (AEE), Application Server (APSE)).

It provides a level of control to the user that is not available in the prior art. The user has the capability to customize and/or create the services based on his preferences with easy to use commonly available web interfaces.

It provides a robust and flexible way to integrate different services enabling service interworking.

It provides a service creation framework that allows the creation of new and innovative services in a quick and efficient manner.

BRIEF DESCRIPTION OF THE DRAWINGS

The present invention will be more readily understood with reference to the accompanying drawings in which.

DETAILED DESCRIPTION OF PREFERRED EMBODIMENTS

This invention provides an overall concept of the so-called IPSA (IP based service architecture). IPSA is a layered and distributed functional architecture that is completely based on IETF (Internet Engineering Task Force) protocols and particularly, well-suited to work within the SIP (Session Initiation Protocol) framework. IPSA provides clean and flexible service architecture for service creation, provisioning and management of IP multimedia services. It allows integration of different kinds of IP-based services over an access independent IP-based network paving way to the creation of innovative services.

Hence, according to the invention a new approach in defining a robust service architecture for supporting multimedia services, instant messaging and other evolving IP services for the next generation IP based networks is provided.

In the following, preferred embodiments of the invention are described in more detail with reference to the accompanying drawings.

Figure 1:
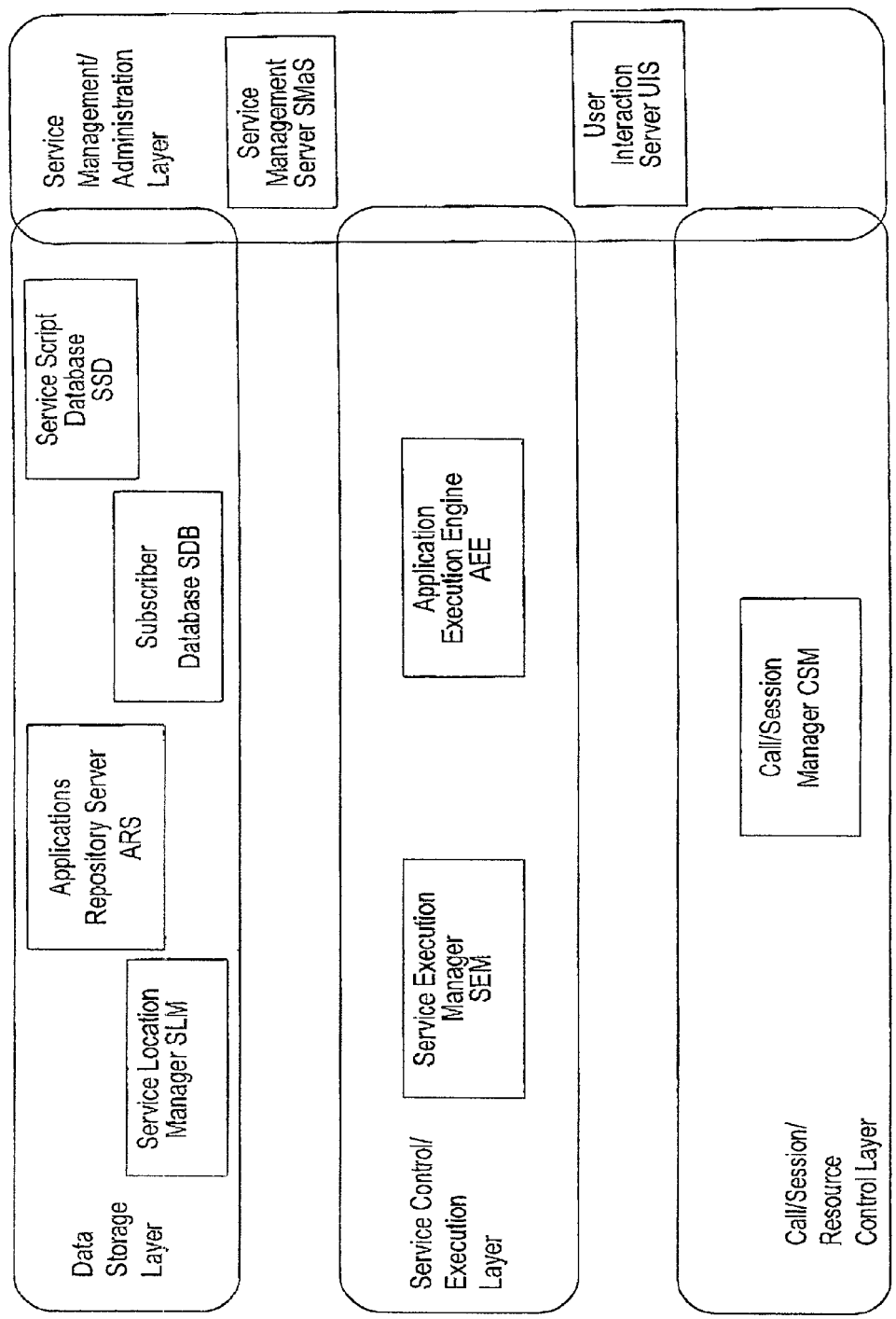
FIG. 1 shows functional elements in different layers according to a first embodiment.

FIG. 1 provides a layered view of the functional elements defined in the service architecture presented here. These layers broadly indicate the functions related to the service architecture. Basically, four different layers can be distinguished which are described in the following.

The Call/Session/Resource Control Layer belongs to the core network that provides the call routing and call-control functions. The Service Control and Execution Layer provides the key function of providing control and triggering appropriate services and executing them. The Data Storage Layer includes the database facilities to store and manage subscriber profiles and service logic. The Service Management and Administration Layer is an operations and administration layer to facilitate interface functions to third party networks and for user service configurations.

Figure 2:
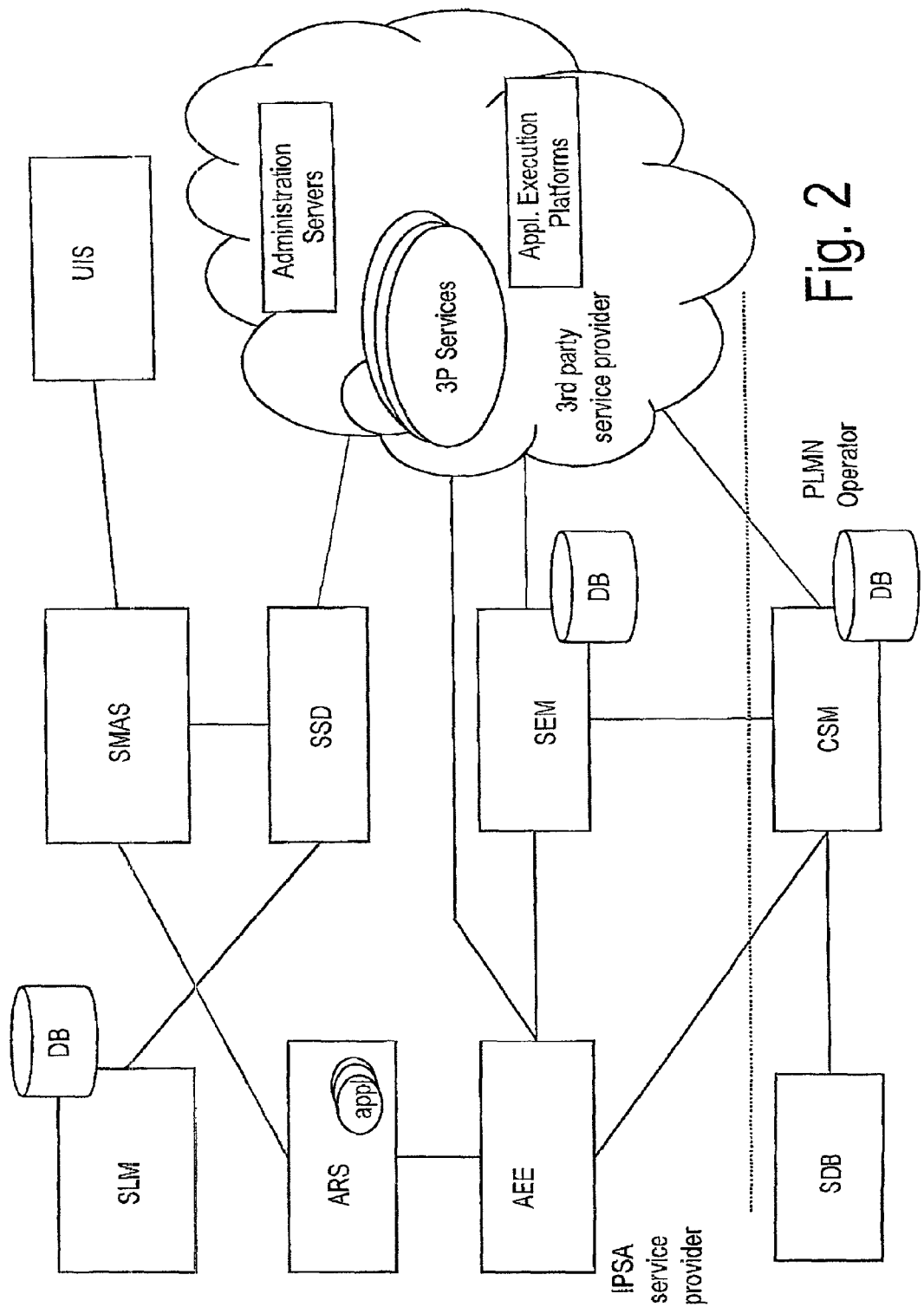
FIG. 2 shows logical interconnections between elements according to the first embodiment.

In the following, each of the functional elements located in the above-described layers are described. FIG. 2 shows the reference architecture for the IPSA with interfaces between the different elements. Thus, FIG. 2 illustrates the connections between the functional elements.

Choice of the protocol usages on the interfaces are dependent on suitable IETF protocols. A preferred protocol is the SIP (Session Initiation Protocol), but also Lightweight Directory Access Protocol (LDAP) or others may be used.

A Call/Session Manager (CSM) is logically located in the Call/Session/Resource layer. The CSM provides SIP call routing and call control functionality. However, it does not provide any service control. For performing service control, the CSM interacts with another functional element, i.e., a Service Execution Manager (SEM) which is described next. That is, the CSM forwards a service request from a subscriber to the SEM.

The Service Execution Manager (SEM) manages the execution of the requested service. In particular, the SEM retrieves a so-called SEM script from a Service Script Database. The SEM script contains a description of the requested service. That is, the SEM itself does not need to have information regarding the requested service since this is provided from the Service Script Database by means of the SEM script. However, it is noted that the SEM script does not contain the exact information regarding the execution of the service. Basically, the SEM script contains information regarding as which Application Execution Engine (AEE) is able to actually perform the requested service. Thus, the SEM is adapted to invoke an appropriate Application Execution Engine (AEE) according to the information of the SEM script. Preferably, the SEM script is retrieved based on the particular subscriber (user) requesting the service. That is, the SEM script is retrieved by using an identification code. For example, an IPSA identification (IPSA-ID) of the particular subscriber can be used.

The SEM may have a memory (e.g., a database) for temporarily storing of SEM scripts. Thus, it is not always necessary that the SEM accesses the Service Script Database SSD.

The Application Execution Engine (AEE) serves to actually process a service request. That is, the AEE executes a service logic script which describes the service logic. The service logic script is provided by an Application Repository Server (ARS). Thus, on receipt of a service request from the SEM, the AEE retrieves the appropriate service logic script from the Application Server. In addition, the AEE may invoke other AEE depending on the service logic script. This may be necessary in case the actual service to be executed requires other services which cannot be performed by the current AEE. In addition, the AEE can also generate charging information for using specific services. The AEE may also be a third party AEE (3P-AEE) in case a third party service (3P-service) is requested.

A Service Location Manager (SLM), functionally located in the data storage layer, maintains a table for maintaining an association between the SEM and a user identification (user-id). The SLM has access (or interface) to resources information within IPSA network for SEM selection. The SLM returns, upon query, the active SEM address to a requesting entity for a particular user.

The Application Repository Server (ARS) is also functionally located in the data storage layer. The ARS comprises a database for service logic scripts. It interacts with the AEE to download service logic scripts, as already described above. Furthermore, it is updated by a Service Management Server (SMaS) during service creation, for example.

Moreover, a Subscriber Database (SDB) is functionally provided in the data storage layer. The SDB provides a storage for subscriber information like identities, aliases, preferences etc. The SDB is not necessarily part of the IPSA network, but may store identities of IPSA service providers.

The Service Script Database (SSD) already mentioned above stores the SEM Scripts to be run by the Service Execution Manager (SEM). It downloads the SEM Script to the SEM when necessary. The SSD is also involved in service creation and service profile management. That is, in case a new service is created or an existing service is amended or changed, generally also the corresponding SEM scripts have to be altered.

The Service Management Server (SMaS) is functionally located in the Service Management/Administration Layer. It generates/modifies the SEM scripts when necessary and pushes them to a central database and/or to the SSD. Furthermore, the SMaS generates service logic scripts and pushes them to the ARS. Moreover, the SMaS interacts with third party networks for a third party service access.

The User Interaction Server (UIS) is also functionally locates in the Service Management/Administration Layer. The UIS acts as a client for SMaS and interacts with end-users for service configuration and user involved service creation. The UIS interacts with end-users and provides a GUI (Graphical User Interface) with web-based interface.

In the following, it is described how the architecture supports the basic functions like the service registration, service invocation and execution, and service creation and configuration.

First, the service registration is described. The subscriber performs the registration to inform his presence in the network. The service registration process involves the CSM forwarding the registration message to the SEM. The subscription profile within the core network must contain the IPSA network addresses.

Figure 3:
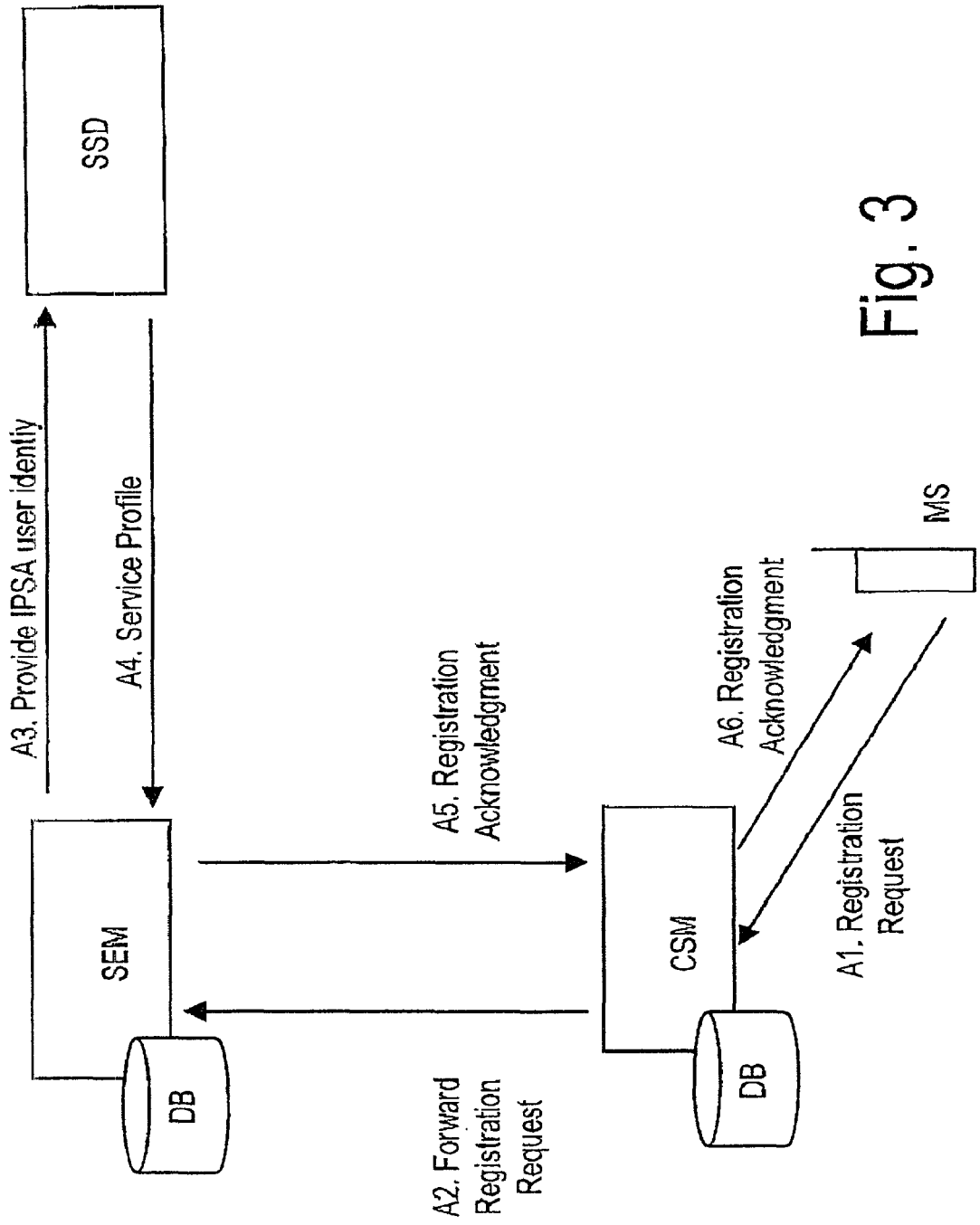
FIG. 3 shows a basic service registration according to the first embodiment.

FIG. 3 shows how the service registration is performed. In step A1, the user initiates a registration request (via his mobile station MS, for example) which is received by the CSM. The registration request includes an IPSA user identity (IPSA-ID) by which the user can be identified within the IPSA. The CSM forwards this registration request to the SEM in step A2. In step A3, the SEM provides the IPSA-ID to the SSD. In turn, the SSD sends a service profile to the SEM in step A4. The SEM may store the service profile in its own database. In steps. A5 and A6, the successful registration is acknowledged to the user by sending a corresponding message.

The service profile stored in the SSD and transmitted to the SEM in step A4 is an executable script (e.g. CPL, JES, XML) that contains all the subscribed services and the active service triggering information to invoke those services and related service information. The service information contains the AEE location where the services are actually executed and the relevant service data parameters. It is possible for service profile to be divided as originating and terminating parts or even split into other sections.

Figure 4:
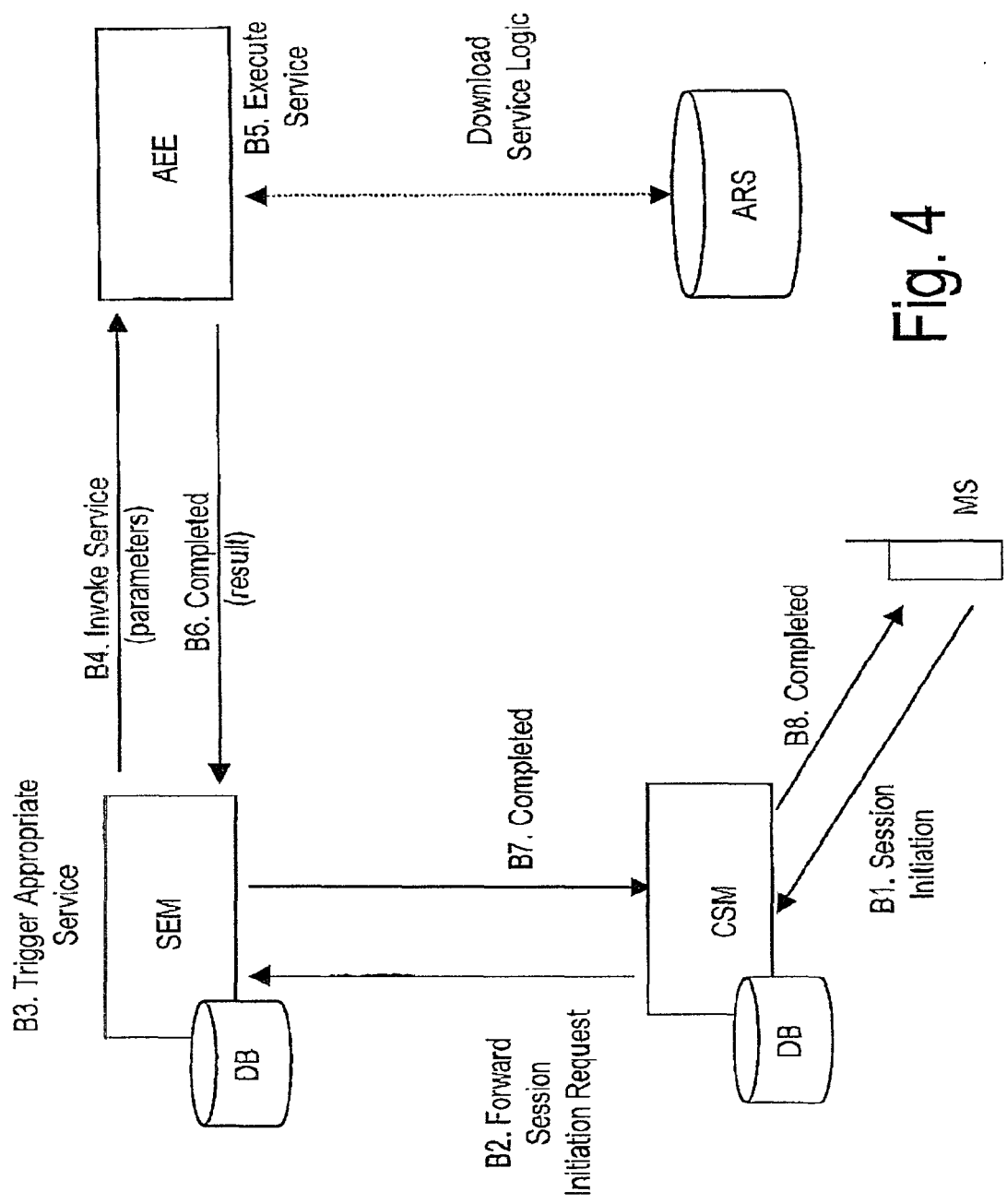
FIG. 4 shows a basic service invocation according to the first embodiment.

Next, Service Invocation is described by referring to FIG. 4, in which a basic service invocation procedure is shown.

In step B1, a session is initiated by the user (via his mobile station MS, for example). In step B2, the CSM forwards the session initiation request to the SEM. In step B3, the SEM processes the request and checks if triggering conditions are met. The triggering conditions are predefined in the SEM scripts. Then, in step B4, the SEM invokes the appropriate AEE with necessary data parameters based on the information available in the service script for that user. It is noted that the service script was made available to the SEM by the above-described service registration. In step B5, the AEE actually executes the requested service. If necessary, the AEE downloads the exact service logic from the ARS. This can be done either at runtime or as an offline operations function. After completing the execution of the service, the AEE sends a completion message including a result (if available or necessary) to the SEM in step B6. The SEM forwards this completion message to the CSM in step B7, and the CSM in turn forwards the completion message in step B8 to the MS.

The completion message may also be processed in the SEM or CSM, but in general, this message including the result is forwarded by the SEM and the CSM to the MS without further using its content, since according to the present embodiment, the service architecture is distributed such that the intermediate network elements (i.e., CSM and SEM) do not need and, in general, are not capable to process the service requested by the MS.

Figure 5:
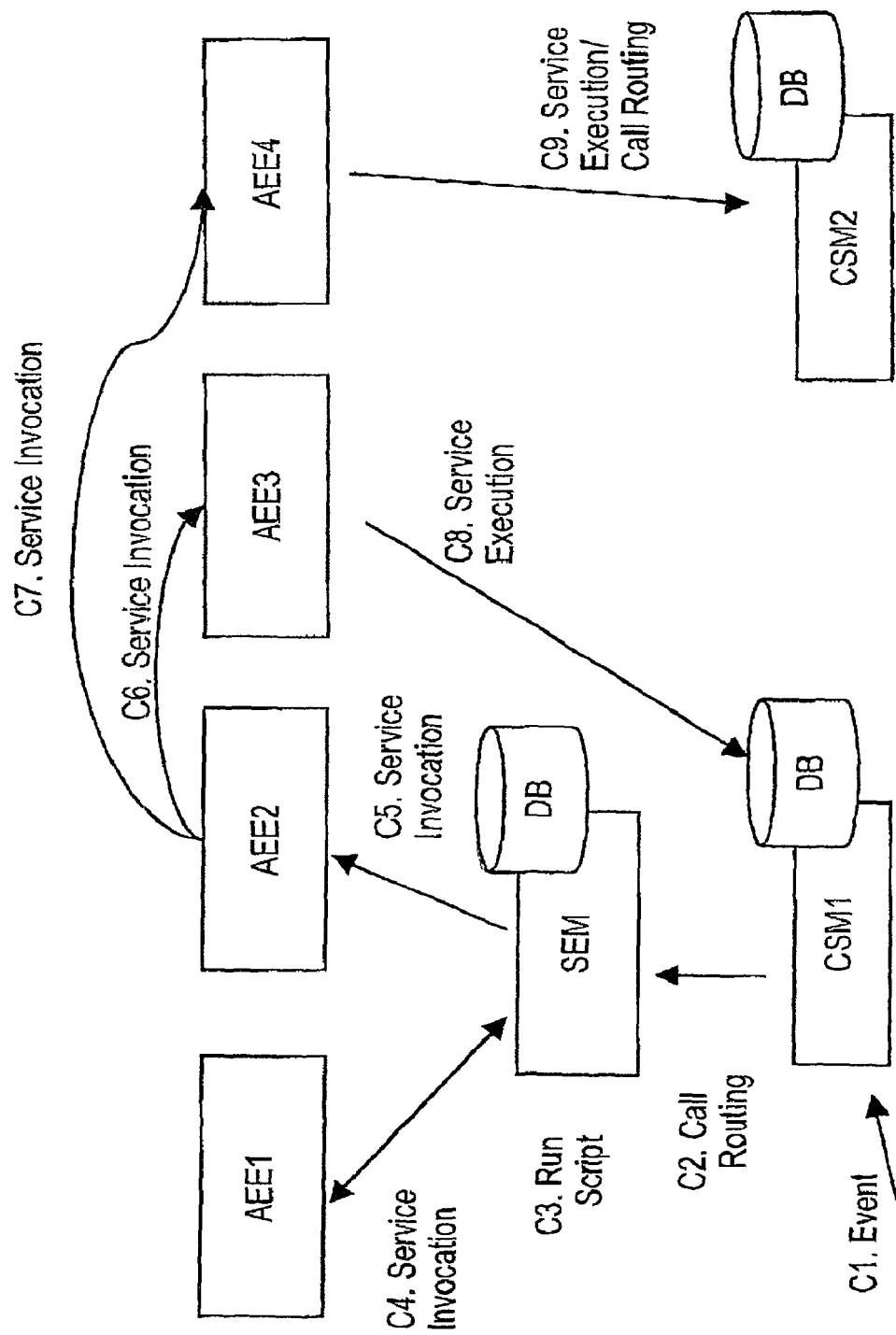
FIG. 5 shows a complex service invocation according to the first embodiment.

As described above, the AEE provides a platform for the execution of services when invocated by SEM. The platform is capable of providing secure, robust and distributed execution environment for different forms or languages of logic (e.g. Java). AEE may use the core network for routing functions and therefore capable of invoking resources like the CSM or media gateway functions. It is also possible for one AEE to invoke service logic on other AEE. A case of more complex service invocation is shown in FIG. 5.

In step C1, an event which initiates a service is received by a first Call/Session Manager CSM1. This event may be a session initiation similar to that according to FIG. 4, but may also be transmitted by another entity in the IPSA network or from an external network. In this example, the requested service may include call routing. The CSM1 forwards this service request in step C2 to the corresponding SEM. In step C3, the SEM runs the corresponding service script. Now, it is assumed that this requested service requires invocation of a plurality of Application Execution Engines AEE1 to AEE4. The corresponding information therefor is included in the service script run by the SEM. For example, in step C4, the service request is forwarded to the Application Execution Engine AEE1, which is adapted to get information as to where a called party is located. Thereafter, based on this information, the SEM forwards a service invocation request to the AEE2, in step C5, which, in turn, forwards a request to another Application Execution Engine, namely, AEE3, in step C6. In parallel to step C6, the AEE2 forwards a request to another Application Execution Engine, i.e., AEE4, in step C7. In this example, it is assumed that a co-operation of AEE3 and AEE4 is necessary for performing the requested call routing, which is routed via a second Call/Session Manager CSM2. This service is performed via steps C8 and C9.

In the following, some examples for call/session establishments are described by referring to the signaling diagrams shown in FIGS. 6 to 8.

Figure 6:
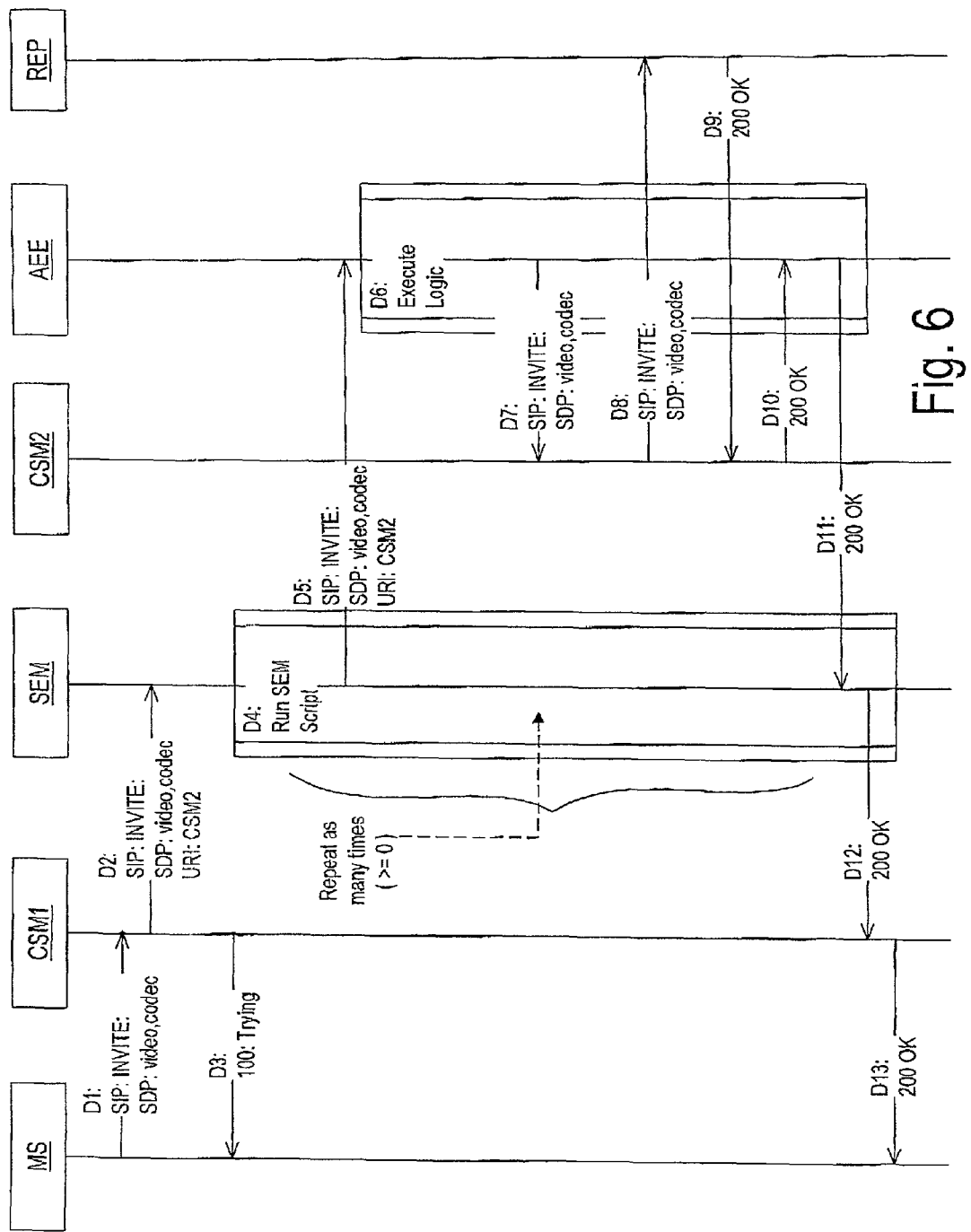
FIG. 6 shows a signaling diagram for a mobile orientated call/session establishment according to the first embodiment.

FIG. 6 shows a mobile originated call/session establishment. In step D1, the mobile station MS sends a session initiation message to a first Call/Session Manager CSM1. In this example, the SIP protocol is used as an IETF protocol. Thus, in step D1, a SIP INVITE message is send.

In general, the SIP INVITE method indicates that the user or service is being invited to participate in a session. The message body contains a description of the session to which the caller is being invited. For two-party calls, the caller indicates the type of media it is able to receive and possibly the media it is willing to send as well as their parameters such as network destination.

In the present case, the type of media is indicated (video, codec) via the Session Description Protocol (SDP) within the message body of the INVITE message.

In step D2, the CSM1 forwards the session initiation request, i.e., the SIP INVITE message to the corresponding SEM. In addition, the message body of the SIP INVITE message now contains an URI of the Call/Session Manager of the called party, i.e., the CSM2. It is noted that the Uniform Resource Identifier (URI) is a compact string of characters for identifying an abstract or physical resource. Furthermore, the CSM1 sends a SIP 100 message to the MS in step D3, wherein the MS is informed about trying to establish a connection.

Upon receipt of the SIP INVITE message from the CSM1 in step D2, the SEM runs the corresponding SEM script in step D4. If necessary (i.e., in case the script is not stored in the database of the SEM), the SEM retrieves the SEM script (service script) from the SSD, as described above.

Thus, according to the script, the SEM forwards the SIP INVITE message in step D5 to the appropriate AEE. The AEE, in turn, processes the service logic script in step D6. That is, the AEE performs the actual establishment of the connection. If necessary, the AEE retrieves the service logic script from the ARS. In step D7, the AEE sends a SIP INVITE request to the CSM2, which is the next hop SIP proxy in this case. The CSM2, in turn, forwards the INVITE message in step D8 to the callee, which is indicated here as a Remote End Point (REP). It is noted that the callee can be any user or entity (e.g., a server) within the same network or also within another network.

If the REP agrees to initiating a session, the REP sends a SIP 200 OK message to the CSM2 in step D9. The CSM2, in turn, sends the message to the AEE in step D10. The AEE then forwards the message in step D11 to the SEM. Thereafter, the processing of the service logic script by the AEE is completed. That is, the process time of step D6 elapses after completion of step D11.

The SEM receives the SIP 200 OK message from the AEE and forwards this message in step D12 to the CSM1. After this, processing of the service script by the SEM is completed. For completing the establishment of the call/session, the CSM1 sends the 200 OK message to the MS.

It is noted that the service script and/or the service logic script can be processed as often as necessary. For example, the service logic script may instruct the AEE to try to establish a connection to REP as often as the REP sends a 200 OK message or until a predetermined time has elapsed. Also, the service script may instruct the SEM to repeat the execution for a predetermined number (for example, to different REP).

Figure 7:
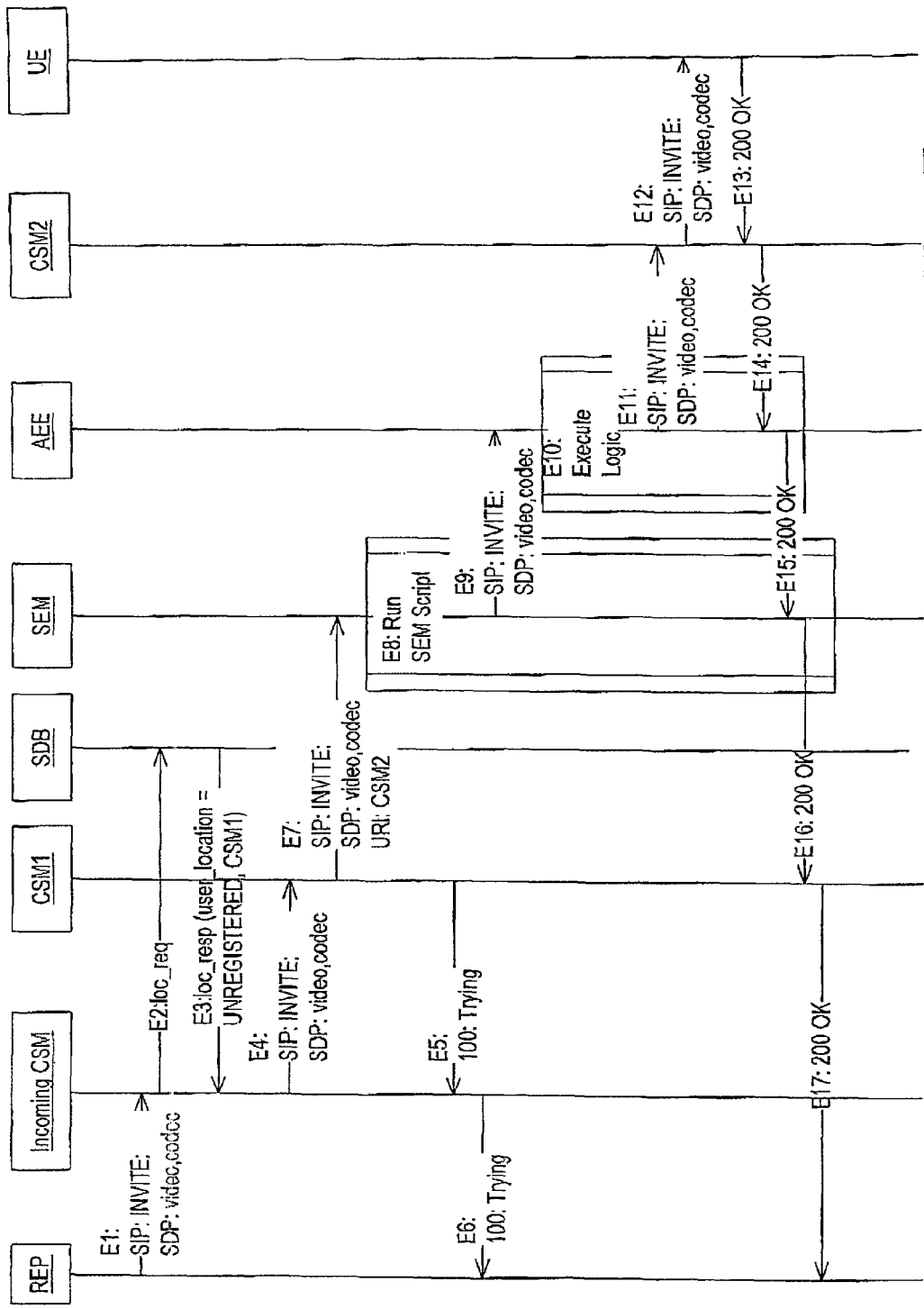
FIG. 7 shows a signaling diagram for a mobile terminated call to a registered User Entity (UE) according to the first embodiment.

Next, by referring to FIG. 7 an establishment of a mobile terminated call to a registered User Equipment (UE) (e.g., an MS) is described. Here, again the SIP protocol is used.

In step E1, an external user REP (Remote Point) sends a SIP INVITE message to the incoming CSM (i.e., the CSM which acts as a gateway to the IPSA). The INVITE message is the same as described above in connection with step D1 in FIG. 6. In step E2, a location request loc_req is started by the incoming CSM in order to identify the user requesting the connection by referring to the Subscriber Database SDB. In step E3, the SDB responses with a loc_resp message in which the location is given as CSM1, and the user is indicated as unregistered. That is, REP is associated to the CSM1. In step E4, the incoming CSM forwards the INVITE message to the CSM1, which in turn forwards the INVITE message to the corresponding SEM in step E7.

As in the process according to FIG. 6, the SEM runs a SEM script (also referred to as service script) in step E8. In this example it is assumed that the UE (i.e., the callee, is registered to the SEM. That is, it is not necessary for the SEM to retrieve a service script. In step E9, the INVITE message is forwarded to the AEE, which executes the service logic script in step E10. In particular, the AEE sends the INVITE message to the CSM2 in step E11, which in turn sends forwards the INVITE message to the UE, in step E12.

In case the user of the UE accepts the initiation of the session, a 200 OK message is sent to the CSM2 in step E13. The CSM2 forwards the 200 OK message to the AEE in step E14, which in turn forwards this message in step E15 to the SEM. After step E15, the processing of the service logic script in the AEE (i.e., the processing of step E10) ends.

Upon receipt of the 200 OK message from the AEE in step E15, the SEM forwards this message in step E16 to the CSM1. After this step, the execution of the service script (i.e., the processing of step E8) ends. The CSM1 finally sends the 200 OK message to REP in step E17. Thus, the session has been initiated successfully.

Figure 8:
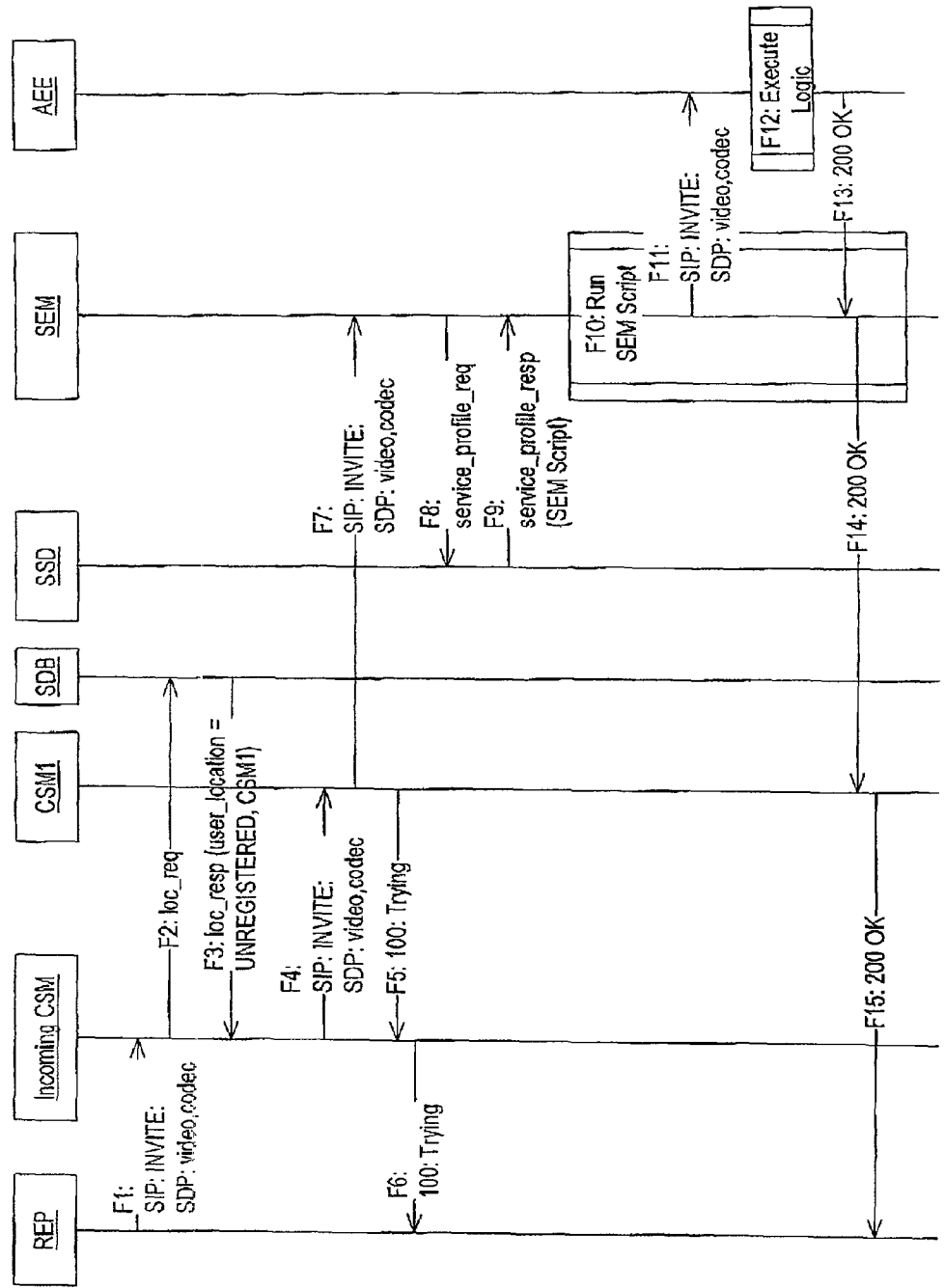
FIG. 8 shows a signaling diagram for a mobile terminated call to an unregistered UE according to the first embodiment.

Next, a mobile terminated call to an unregistered UE is described by referring to FIG. 8.

As in steps E1 to E3 of FIG. 7, a REP sends a SIP INVITE message to an incoming CSM, in step F1, which performs a location request by accessing the SDB, in step F2. The SCB responds with a location response loc_resp (user_location=UNREGISTERED, CSM1), in step F3. That is, the user location, i.e., the CSM to which the caller is associated, is the CSM1, and the user is not registered. Thereafter, the incoming CSM forwards the SIP INVITE message to the CSM1, in step F4, to which the REP is associated. In steps F5 and F6, the REP is informed that the IPSA network tries to establish a call by using a SIP 100 message.

The CSM1 forwards the SIP INVITE message to the SEM in step F7. The SEM, in turn, performs a service profile request in order to obtain the SEM script. That is, in step F8, the SEM access the SSD by sending a service_profile_req. The SSD responds by returning the necessary SEM script in step F9 by sending a service_profile_resp including the SEM script.

In step F10, the SEM runs the SEM script received from the SSD. That is, the SEM sends the SIP INVITE message to the appropriate AEE, in step F11, which in turn execute the actual processes of the requested service (i.e., establishing a connection to the UE) in step F12. The processes carried out by the AEE may be similar to those of steps E11 to E14 in FIG. 8, hence a more detailed description thereof is omitted here for simplifying the description.

In step F13, the AEE sends a 200 OK message to the SEM in order to indicate that the UE accepts establishment of the connection. After this, processing of the service logic by the AEE is completed and ended (i.e., processing of step F12 ends).

In step F14 the SEM sends the 200 OK message to the CSM1. After this, also the processing of the SEM script (i.e., step F10) is finished. In step F15, the CSM1 sends the SIP 200 OK message to the REP in order to complete the call/session establishment.

Thus, according to the above-described embodiment, an overall concept of IPSA (IP based Service Architecture) is provided, which is a layered and distributed functional architecture that is completely based on IETF protocols and particularly, well suited to work within the SIP framework. IPSA provides clean and flexible service architecture for service creation, provisioning and management of IP multimedia services. It allows integration of different kinds of IP-based services over an access independent IP-based network paving way to the creation of innovative services. Thus, a robust service architecture for supporting multimedia services, instant messaging and other evolving IP services for the next generation IP based networks is defined.

According to the present embodiment, a script based approach to control/manage multiple services is provided. The system controlling the fragmented services is the SEM (Service Execution Manager). SEM is centralized and automated service manager, which means that it is not necessary to notify the SEM if new services appear (or old ones disappear).

In addition, the SMaS (Service Management Server) generates and maintains SEM scripts. That is the SMaS keeps updating the SEM (via the SEM scripts) what kind of services are available.

The embodiment described above can be implemented in a variety of ways and is applicable to various communication networks and business cases. For example, IPSA can be applied to the 3GPP R00 network architecture by treating the CSCF as CSM (this also limits the CSCF functionalities as a service control entity). On the other hand, it also possible to merge CSM with SEM (along with other functions) to yield a more complex node like a CSCF or otherwise.

Furthermore, the SSD and the SDB can be implemented together such that a central subscriber database is achieved.

Although, functionally the AEE and ARS are distinct, it is possible to realize them as one single entity.

Next, a second embodiment of the invention is described with reference to FIGS. 9 to 11.

The Service Execution Manager (SEM) described above in the first embodiment is used as a centralized service triggering and control point of the IPSA network. The SEM retrieves SEM scripts (i.e., subscriber services profiles) and stores them if needed. This means that the SEM will be heavily loaded if there is no load distribution mechanic used. The Dynamic SEM discovery method according to the second embodiment provides a way to distribute the load a cross multiple SEMs.

Figure 9:
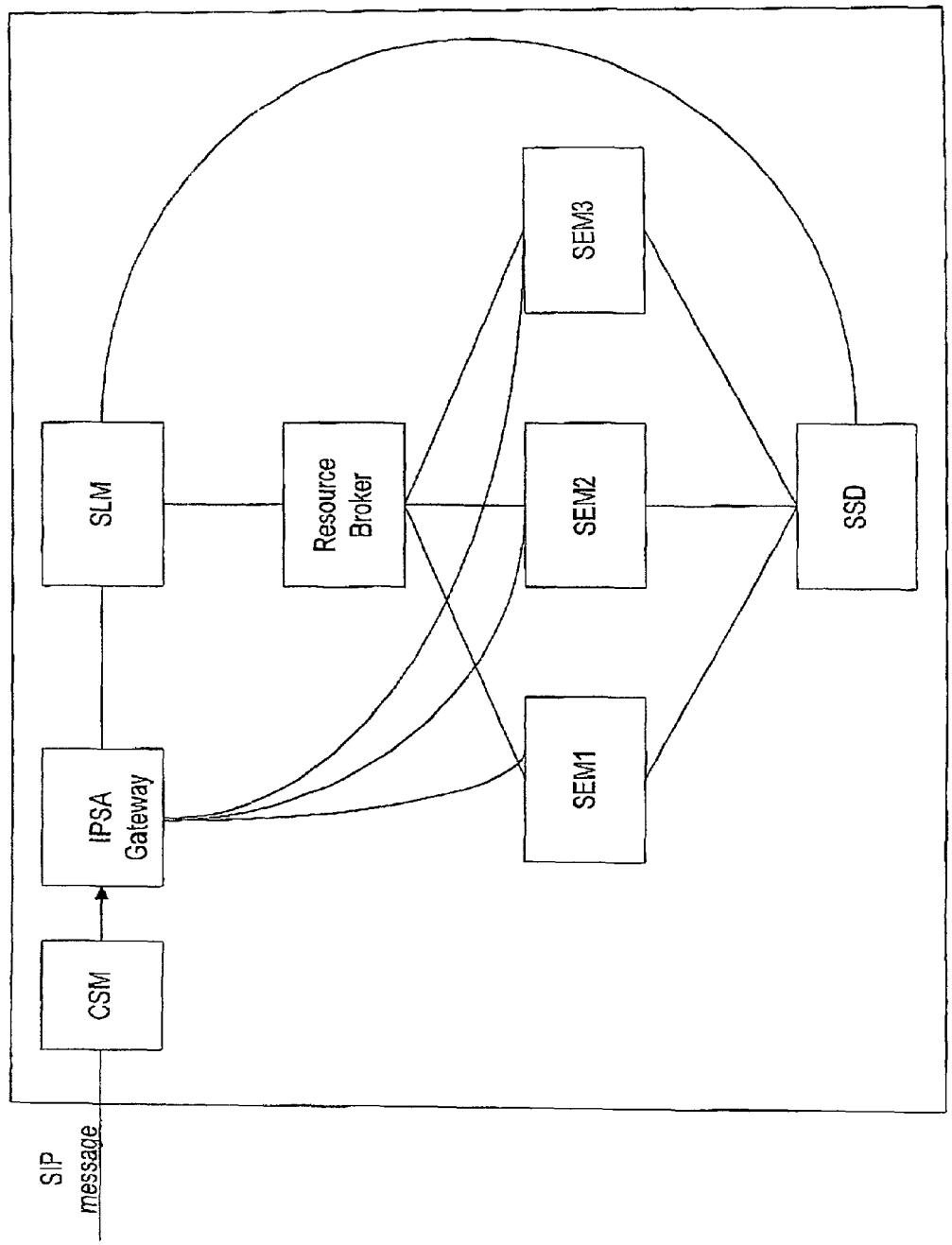
FIG. 9 shows functional elements involved in service triggering and control according to a second embodiment.

FIG. 9 shows the functional elements involved in service triggering and control.

A SIP message from external entering the IPSA network arrives at an incoming CSM (as, e.g., shown in FIGS. 7 and 8 above) and is forwarded to an IPSA gateway.

This IPSA gateway is an additional element according to the present embodiment and serves to provide a connection to one of a plurality of Service Execution Managers SEM1 to SEM3. It is an entry point to the IPSA and also acts as a SIP node.

The Service Location Manager (SLM) maintains a table of SEM to user pair information and queries a Resource Broker RB for a free SEM if none has yet been associated with the user. It also has the ability to act as a SIP redirect server. Otherwise, the SLM according to the present embodiment has the same functions as the SLM according to the first embodiment.

The Resource Broker RB has information about active load and/or capability of all Service Execution Managers (in this example, SEM1 to SEM3). It is adapted to select a less loaded SEM and to indicate this to the SLM when inquired.

The SEMs are similar to the SEM described above with respect to the first embodiment. That is, each of the SEM1 to SEM3 is adapted to retrieve a service subscription profile (i.e., an SEM script) for an external service script database SSD, and to initiate any service based on the subscription information. Also the SSD is similar to that according to the first embodiment. That is, the SSD is a database which contains all the user service subscription profiles.

In the following, the additional processes to select the appropriate SEM are described by referring to FIGS. 10 and 11. Here, a call flow using REGISTER as an example is used. However, INVITE would follow exactly the same sequence correspondingly.

Figure 10:
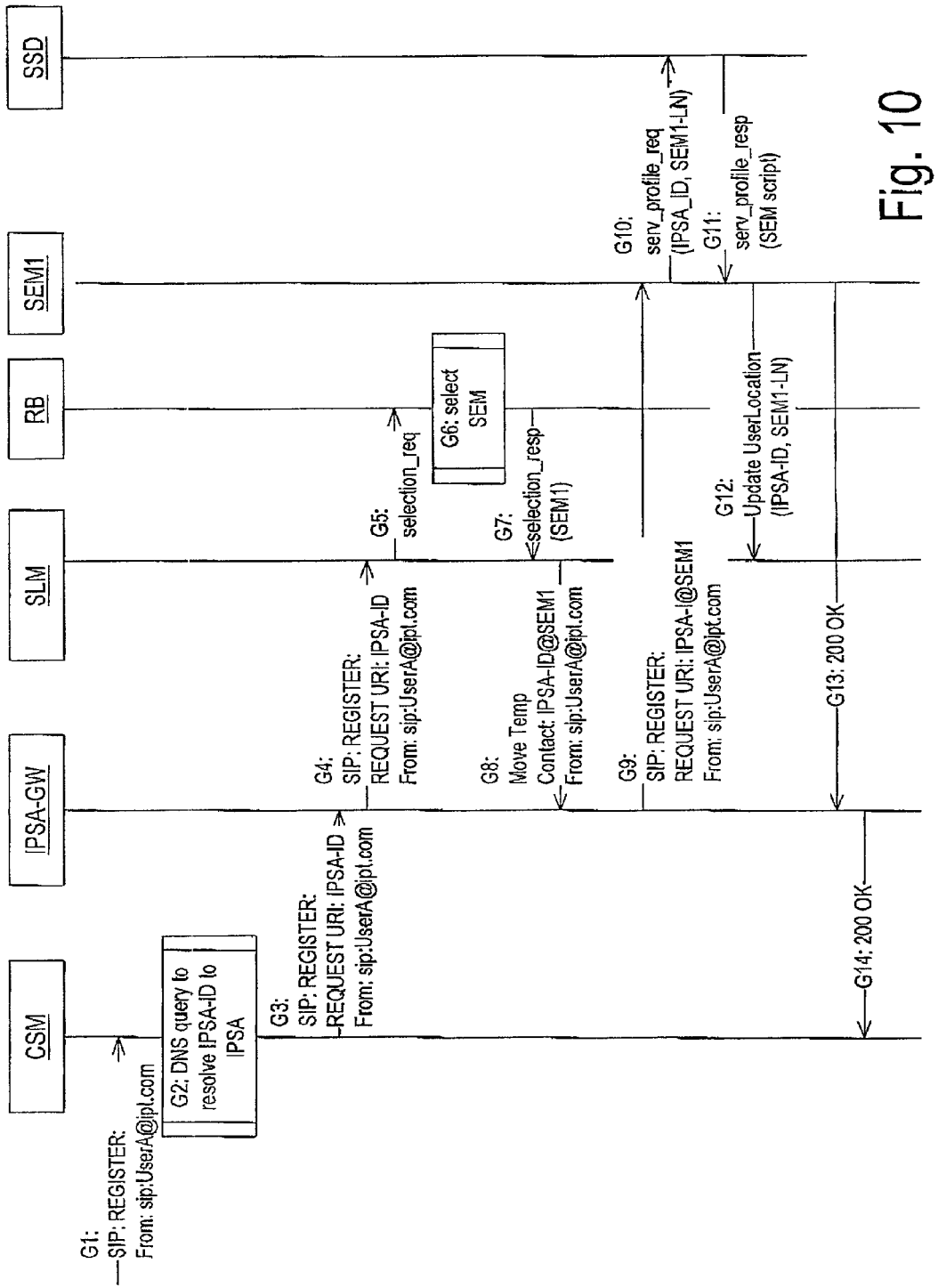
FIG. 10 shows a signaling diagram for registering a user and selecting a Service Execution Manager according to the second embodiment.

FIG. 10 shows a signaling diagram illustrating the process of selecting a SEM. In step G1, a corresponding register request is received by a CSM. In this example, the register request is a SIP REGISTER request from a USERA in the domain ipt.com. In step G2, the CSM performs a DNS (Domain Name Server) query to resolve IPSA-ID to IPSA. In step G3, the CSM sends a register request to the IPSA gateway IPSA-GW, wherein the request is in the form of SIP: REGISTER: REQUEST URI: IPSA-ID From: sip:UserA@ipt.com. In step G4, the IPSA-GW forwards the register request to the SLM. The SLM recognizes that no SEM is allocated for this IPSA-ID. Hence, it is necessary to get a free SEM from the Resource Broker RB.

Thus, in step G5 the SLM sends a selection request to the Resource Broker RB. The RB selects a SEM that is less loaded in step G6. In this example, the SEM1 is selected. Hence, the RB sends a corresponding selection response (selection_resp) to the SLM in step G7. The SLM concatenates the IPSA-ID with the SEM1. Then, in step G8, the SLM sends a SIP Move Temp message to the IPSA-GW such that the IPSA-GW obtains the information that the caller is associated to the SEM1. Thereafter, in step G9 the register procedure is continued by sending the register request (now having the REQUEST URI: IPSA-ID@SEM1) to the SEM1.

After this, the processes as described in the first embodiment are performed. That is, in steps G10 and G11, the SEM script is retrieved from the SSD (wherein the SEM is indicated by an identifier SEM1-LN) After this, if necessary, the service execution can be started. Nevertheless, in step G12, an Update UserLocation message is sent to the SLM such that the SLM is informed about the location, i.e., the associated SLM of the user. In order to inform the user of the successful registration, a SIP 200 OK message is sent in steps G13 and G14.

The SLM keeps a mapping table to tie subsequent SIP messages for the same user to the same SEM serving that subscriber. When the service is completed, the SEM sends an indication to SSD and SSD sends an indication to SLM to remove the mapping table for that user. In this way, SEM can free up some of it resources for other user.

Figure 11:
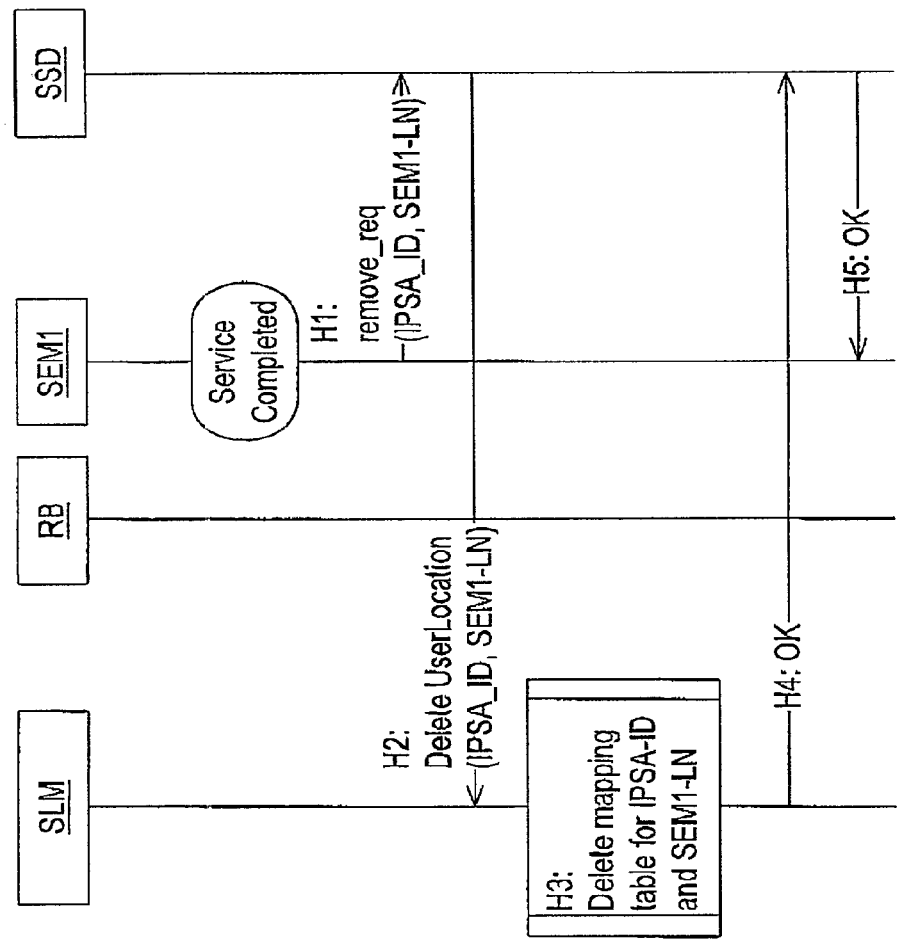
FIG. 11 shows a signaling diagram illustrating the process for terminating a service according to the second embodiment.

This procedure is illustrated in FIG. 11. After the service is completed, the SEM1 sends a remove request remove_req having the IPSA-ID and the identifier of the SEM1 as parameters to the SSD in step H1. In turn, the SSD sends a Delete UserLocation with the same parameters to the SLM in step H2. Thereafter, the SLM deletes the mapping table for the IPSA-ID and the SEM1-LN in step H3. The successful deletion is acknowledged in step H4 to the SSD in step H4, which sends an acknowledge message to the SEM1 in step H5.

Thus, according to the second embodiment, load balancing and scalability of an IP based service Architecture (IPSA) can be achieved.

While the invention has been described with reference to preferred embodiments, the description is illustrative of the invention and is not to be construed as limiting the invention. Various modifications and applications may occur to those skilled in the art without departing from the scope of the invention as defined by the appended claims.

The invention claimed is:

1. A network system comprising:
 a service control device; and
 at least one application execution device;
 wherein the service control device is configured to receive a service request, to select an appropriate application execution device according to the service request, and to invoke the selected application execution device, and
 wherein the application execution device is configured to perform the service requested by the service request,
 wherein the network system further comprises a service information database in which information about services are stored as executable service scripts describing the respective service, wherein the service control device is configured to access the service information database, to retrieve a service script and to use the service information of the retrieved service script for selecting and invoking the application execution device.

2. The network system according to claim 1, wherein the information about services is specific for each user.

3. The network system according to claim 2, wherein the service control device is configured to retrieve information about services from the service information database based on an identifier associated to a user.

4. The network system according to claim 1, wherein the service control device and the service information database are separated entities, and the service control device comprises a memory in which the information obtained from the service database can be temporarily stored.

5. The network system according to claim 1, further comprising a call/session managing device configured to forward service requests to the service control device.

6. The network system according to claim 1, further comprising a service location managing device configured to maintain an association between the service control device and a user.

7. The network system according to claim 1, further comprising a service logic database for service logic information, wherein the application execution device is configured to access the service logic database in order to obtain information for executing a requested service.

8. The network system according to claim 7, wherein the information for executing a requested service is stored in form of a service logic script stored in the database.

9. The network system according to claim 1, further comprising a service managing device is configured to generate and/or modify service information to be stored in the service database.

10. The network system according to claim 7, further comprising a service managing device configured to generate and/or modify information to be stored in the service logic database.

11. The network system according to claim 9, further comprising an interaction unit which is configured to provide an interface between the service managing device and a user.

12. The network system according to claim 10, further comprising an interaction unit which is configured to provide an interface between the service managing device and a user.

13. The network system according to claim 1, wherein the network is configured to access an external subscriber database which is not part of the network, and wherein the subscriber database is configured to store identifiers.

14. The network system according to claim 1, further comprising
 a plurality of service control devices and
 a selecting device configured to select an appropriate service control device.

15. The network system according to claim 14, wherein the selecting device is configured to select a service control device in dependence on the operation load of the respective service control device.

16. The network system according to claim 14, further comprising a service location managing device which is configured to maintain an association between a particular user and the selected service control device.

17. The network system according to claim 16, wherein the service location managing device comprises a mapping table configured to maintain the association between the user and the selected service control device.

18. The network system according to claim 6, wherein the service location managing device is configured to manage resources information for selection of a service control device.

19. The network system according to claim 16, wherein the service location managing device is configured to manage resources information for selection of a service control device.

20. The network system according to claim 1, wherein as a protocol for signalling between the devices the session initiation protocol (SIP) is used.

21. The network system according to claim 1, wherein as a protocol for signalling between the devices the lightweight directory access protocol (LDAP) is used.

22. The network system according to claim 1, wherein the requested service is registration to a particular service.

23. The network system according to claim 1, wherein the requested service is initiation of a communication session.

24. A method comprising:
    receiving, by a service control device, a service request;
    accessing a service information database, in which information about services are stored as executable service scripts describing the respective service, by the service control device, and retrieving a service script;
    selecting an appropriate application execution device according to the service request by using the information of the retrieved service script; and
    invoking the selected application execution device, by using the information of the retrieved service script.

25. The method according to claim 24, wherein the information about services is specific for each user.

26. The method according to claim 25, wherein in the accessing, the service information is retrieved from the service information database based on an identifier associated to a user.

27. The method according to claim 24, further comprising temporarily storing the service information in a storage means of the service control device.

28. The method according to claim 24, further comprising forwarding service requests from a user entity to the service control device via a call/session managing device.

29. The method according to claim 24, further comprising maintaining an association between the service control device and a user.

30. The method according to claim 24, further comprising accessing a service logic database for obtaining service logic information to be used by the application execution device for executing a requested service.

31. The method according to claim 30, wherein the information for executing a requested service is stored in form of a service logic script stored in the database.

32. The method according to claim 24, further comprising of generating and/or modifying of service information to be stored in the service database.

33. The method according to claim 30, further comprising generating and/or modifying information to be stored in the service logic database.

34. The method according to claim 32, further comprising providing an interface between the for generating and/or modifying the information by means of an interaction unit.

35. The method according to claim 30, further comprising providing an interface between the for generating and/or modifying the information by means of an interaction unit.

36. The method according to claim 24, further comprising accessing an external subscriber database which is not part of the network, wherein the subscriber database is configured to store identifiers.

37. The method according to claim 24, wherein the network comprises a plurality of service control devices, the method further comprising
    selecting an appropriate service control device.

38. The method according to claim 37, wherein the selecting is performed in dependence on the operation load of the respective service control device.

39. The method according to claim 37, further comprising maintaining an association between a particular user and the selected service control device.

40. The method according to claim 39, wherein the association between the user and the selected service control device is maintained by means of a mapping table.

41. The method according to claim 29, further comprising managing resources information for selection of a service control device.

42. The method according to claim 37, further comprising managing resources information for selection of a service control device.

43. The method according to claim 24, wherein as a protocol for signalling within the network the session initiation protocol (SIP) is used.

44. The method according to claim 24, wherein as a protocol for signalling within the network the lightweight directory access protocol (LDAP) is used.

45. The method according to claim 24, wherein the requested service is registration to a particular service.

46. The method according to claim 24, wherein the requested service is initiation of a communication session.

47. A computer program embodied on a computer storage device, the computer program being configured to control a processor to perform operations comprising:
    receiving, by a service control device, an executable service request;
    accessing a service information database, in which information about services are stored as service scripts describing the respective service, by the service control device, and retrieving a service script;
    selecting an appropriate application execution device according to the service request by using the information of the retrieved service script; and
    invoking the selected application execution device, by using the information of the retrieved service script.

\* \* \* \* \*